(12) United States Patent
Ise

(10) Patent No.: US 9,822,471 B2
(45) Date of Patent: Nov. 21, 2017

(54) WOVEN FABRIC FOR AIRBAGS HAVING SUPERIOR SUPPRESSION OF AIR PERMEABILITY, HIGH TEAR STRENGTH, AND EXCELLENT RELIABILITY

(71) Applicant: ASAHI KASEI FIBERS CORPORATION, Osaka-shi, Osaka (JP)

(72) Inventor: Fumiaki Ise, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/652,609

(22) PCT Filed: Dec. 17, 2013

(86) PCT No.: PCT/JP2013/083758
§ 371 (c)(1),
(2) Date: Jun. 16, 2015

(87) PCT Pub. No.: WO2014/098082
PCT Pub. Date: Jun. 26, 2014

(65) Prior Publication Data
US 2015/0368834 A1    Dec. 24, 2015

(30) Foreign Application Priority Data
Dec. 17, 2012   (JP) ................. 2012-274919

(51) Int. Cl.
| | |
|---|---|
| D03D 1/02 | (2006.01) |
| B60R 21/235 | (2006.01) |
| D03D 15/00 | (2006.01) |
| D06C 15/08 | (2006.01) |
| D03D 15/08 | (2006.01) |
| D06C 15/00 | (2006.01) |

(52) U.S. Cl.
CPC ............ D03D 1/02 (2013.01); B60R 21/235 (2013.01); D03D 15/0077 (2013.01);
(Continued)

(58) Field of Classification Search
CPC . B63B 13/00; B63B 2021/504; B63B 21/502; B32J 2/12; F15D 1/10;
(Continued)

(56) References Cited

U.S. PATENT DOCUMENTS

| | | |
|---|---|---|
| 5,296,278 A | 3/1994 | Nishimura et al. |
| 2005/0170723 A1 | 8/2005 | Okada |

(Continued)

FOREIGN PATENT DOCUMENTS

| | | |
|---|---|---|
| CN | 1856614 A | 11/2006 |
| JP | 6-192938 | 7/1994 |

(Continued)

OTHER PUBLICATIONS

English-language International Search Report from the Japanese Patent Office for International Application No. PCT/JP20131083758 dated Feb. 13, 2014.
(Continued)

*Primary Examiner* — Arti Singh-Pandey
(74) *Attorney, Agent, or Firm* — Finnegan, Henderson, Farabow, Garrett & Dunner, LLP

(57) ABSTRACT

A woven fabric for an air bag characterized by the asymmetry (R), in the front and back of the woven fabric and indicated by the following formula, of the radius of curvature ($\phi$ of an intersecting section in which the warp thread and the weft thread come in contact in the cross section of the woven fabric, being in the range of 1.05-1.50, $R=\phi a/\phi b$ ($\phi a$ indicates the larger radius of curvature out of the radii of curvature ($\phi$) in the front and back surfaces of the woven fabric, and $\phi b$ indicates the smaller radius of curvature).

14 Claims, 1 Drawing Sheet

(52) U.S. Cl.
CPC ............. *D03D 15/08* (2013.01); *D06C 15/00* (2013.01); *D06C 15/08* (2013.01); *B60R 2021/23509* (2013.01)

(58) Field of Classification Search
CPC .... F15D 1/0022; F15D 1/0278; F15D 1/0297; B60R 2021/23509; B60R 21/235; D03D 5/0077; D03D 15/08; D03D 1/02; D06C 5/00; D06C 15/08
See application file for complete search history.

(56) References Cited

U.S. PATENT DOCUMENTS

2011/0020628 A1    1/2011  Fukudome et al.
2012/0089299 A1*   4/2012  Breed .................... B60C 11/24
                                                    701/36

FOREIGN PATENT DOCUMENTS

| | | |
|---|---|---|
| JP | 2010-111958 | 5/2010 |
| JP | 200-58137 | 3/2011 |
| JP | 2011-58118 | 3/2011 |
| JP | 2012-158850 | 8/2012 |
| WO | WO 93/05985 | 4/1993 |
| WO | WO 2009/119302 A1 | 10/2009 |

OTHER PUBLICATIONS

International Preliminary Report on Patentability dated Jun. 23, 2015, and Written Opinion (dated Feb. 18, 2014) for International Application No. PCT/JP2013/083758 from the International Bureau of WIPO.

* cited by examiner a Entangled portions
b Non-entangled portion

WOVEN FABRIC FOR AIRBAGS HAVING SUPERIOR SUPPRESSION OF AIR PERMEABILITY, HIGH TEAR STRENGTH, AND EXCELLENT RELIABILITY

TECHNICAL FIELD

The present invention relates to an air bag used as the bag-shape article of an air bag unit functioning as a clue protective device during a motor vehicle collision, and more particularly, to a woven fabric for an air bag for obtaining an air bag that deploys at high speed, has high pressure resistance and is resistant to the environment.

BACKGROUND ART

Air bags are being increasingly installed in motor vehicles for the purpose of reducing the impact on the body during a collision accident involving an automobile or other motor vehicle. Air bags absorb and reduce the impact on the body by being inflated by a gas at the time of a collision, and in addition to air bags for the driver's seat and passenger's seat, air bags such as curtain air bags, side air bags, knee air bags and rear air bags are being installed and used practically throughout vehicles to ensure clue protection. Moreover, air bags have also been proposed that are installed so as to deploy outside the clue compartment in order to protect pedestrians.

Air bags such as curtain air bags, which are deployed and inflated from the ceiling above the doors to protect the head and neck regions of clue during a side collision, or side impact air bags, which are deployed and inflated from the car seats to protect the chest and pelvis of clue, are required to cushion the human-body by being deployed at high speed due to the short distance between the vehicle sidewall and the occupant's body. In addition, since air bags for protecting pedestrians cover a large area, they are also required to prepare for a collision by being deployed at high speed.

These air bags are folded up and stored in a compact form during ordinary vehicle operation. When a collision has been detected by a sensor and the air bag deploys and inflates, the air bag is unfolded from its folded state by gas generated with an inflator and flies out by breaking through its storage compartment, such as the fitting of a ceiling trim cover or the stitched portion of a passenger seat, where it is sufficiently inflated and pressure has been applied to cushion the human-body.

In the case of air bags that are required to deploy at higher speeds, it is necessary to enhance the pressure resistance of the bag-shape article in order to obtain an air bag that offers a higher level of safety. Therefore, the need has arisen to suppress air permeability under high-pressure conditions to a greater extent than in the past. Moreover, it is also necessary to enhance tear strength so as not to burst even when stress acts on the bag under high-pressure conditions.

Although a method involving providing a resin coating on a fabric has been used to suppress air permeability, the use of a lightweight fabric free of a resin for the air bag base cloth is advantageous for high-speed deployment.

For example, Patent Document 1 discloses a woven fabric suitable for an air bag having a non-smooth surface on the inside thereof that has a single-sided non-smooth structure obtained by weaving from polyester filament yarn, scouring, heat-setting and carrying out single-sided calendering processing. Fine particles contained in the inflation gas are trapped in the woven fabric due to the bulkiness of the non-smooth surface on the inside. Although the woven fabric has a bilateral surface structure consisting of a smooth side and a non-smooth side due to single-sided calendering processing, there was no difference between the front and back in the structure of the curved woven thread, and there was no asymmetry extending to the deep structure of the woven fabric. The only disclosure regarding air permeability is a decrease in air permeability at a pressure difference at a water column height of 0.5 inches, and the problem of improving dynamic air permeability at high pressure is not solved. Namely, there is no indication of a woven fabric for an air bag that has low air permeability under even higher pressure conditions during air bag deployment and demonstrates superior reliability under high loads in terms of having high tear strength. Moreover, there is also no indication of suppressing changes in the properties thereof in an environment exposed to a high temperature.

PRIOR ART DOCUMENTS

Patent Documents

Patent Document 1: Japanese Unexamined Patent Publication (Kokai) No. H06-192938

SUMMARY OF THE INVENTION

Problems to be Solved by the Invention

An object of the present invention is to provide a woven fabric for an air bag that demonstrates superior suppression of air permeability as an air bag when deployed under high pressure and at high speed, has high tear strength, demonstrates excellent reliability under high loads, and maintains the same even after being exposed to a high-temperature environment.

Means for Solving the Problems

As a result of conducting extensive studies, the inventor of the present invention found that a woven fabric, which has an asymmetrical structure in which the form of the warp thread and weft thread of the woven fabric differs between the front and back sides, suppresses air permeability under high pressure, does not exhibit decreases in mechanical properties such as tear strength, has a side on which air permeability is suppressed under high pressure and a side on the opposite side therefrom having superior flexibility and cushioning, and maintains these properties even after exposure to a high-temperature environment, thereby leading to completion of the present invention.

Namely, the present invention relates to a woven fabric for an air bag as described below.

(1) A woven fabric for an air bag composed of synthetic fibers, wherein asymmetry R, with respect to the front and back sides of the woven fabric and represented by the following equation, of the radius of curvature $\phi$ of an intersecting section where the warp thread and the weft thread come in contact in a cross-section of the woven fabric is within the range of 1.05 to 1.50:

$$R = \phi a / \phi b$$

wherein $\phi a$ represents the larger radius of curvature among the radii of curvature $\phi$ on the front side and rear side of the woven fabric, and $\phi b$ represents the smaller radius of curvature.

(2) The woven fabric for an air bag described in (1) above, wherein the tear utilization factor E of tear strength (N) with respect to tensile strength (N/cm) is 0.20 to 0.50.

(3) The woven fabric for an air bad described in (1) or (2) above, wherein the tear utilization factor after exposing to an environment at 120° C. for 100 hours is 90% or more in comparison with that prior to exposure.

(4) The woven fabric for an air bag described in any of (1) to (3) above, wherein asymmetry U, with respect to the front and back sides of the woven fabric and represented by the following equation, of the contact angle θ of the intersecting section is within the range of 1.05 to 1.40:

$$U=\theta b/\theta a$$

wherein θb represents the contact angle on the φb side and θa represents the contact angle on the φa to side.

(5) The woven fabric for an air bag described in any of (1) to (4) above, wherein a cyclohexane-extracted oil component is contained at 0.03% by weight to 0.3% by weight.

(6) The woven fabric for an air bag described in any of (1) to (5) above, wherein the synthetic fibers are composed of synthetic fibers having a substantially round cross-section filaments.

(7) The woven fabric for an air bag described in any of (1) to (6) above, wherein the woven fabric is a plain weave fabric.

(8) The woven fabric for an air bag described in any of (1) to (7) above, wherein the fineness of the synthetic fibers that compose the woven fabric is 300 dtex to 720 dtex.

(9) The woven fabric for an air bag described in (8) above, wherein the fineness of the synthetic fibers that compose the woven fabric is 380 dtex to 550 dtex, and the filament fineness thereof is greater than 2 dtex but less than 8 dtex.

(10) The woven fabric for an air bag described in any of (1) to (9) above, wherein the ratio of air permeability at a pressure difference of 100 kPa between the front and back sides of the woven fabric is 0.90 to 0.20.

(11) The woven fabric for an air bag described in any of (1) to (10) above, wherein a bar code is imprinted thereon.

(12) The woven fabric for an air bag described in any of (1) to (11) above, wherein synthetic fiber substantially free of twisting and having 5 to 30 entanglements/m is used for the weaving thread bulk yarn used to weave the woven fabric.

(13) An air bag that uses the woven fabric for an air bag described in any of (1) to (11) above.

(14) The air bag described in (13) above, which does not have a resin coating.

(15) A method for producing a woven fabric for an air bag composed of synthetic fibers, comprising: 1) weaving the warp threads under high tension with a water jet loom, 2) carrying out a washing treatment step at 80° C. or lower or not carrying out a washing treatment step, 3) drying at a temperature of 120° C. or lower, and 4) carrying out calendering processing.

Effects of the Invention

Since the woven fabric of the present invention has one side that has low air permeability under high pressure and another side that has high flexibility and cushioning, an air bag can be provided that is lightweight and demonstrates superior high-speed deployment in applications requiring high-pressure deployment, has superior reliability of high-pressure deployment, maintains that reliability after being exposed to a high-temperature environment, and demonstrates superior reduction of the potential for injury when contacting the body.

EMBODIMENTS FOR CARRYING OUT THE INVENTION

The following provides a detailed explanation of the present invention.

Figure 1:
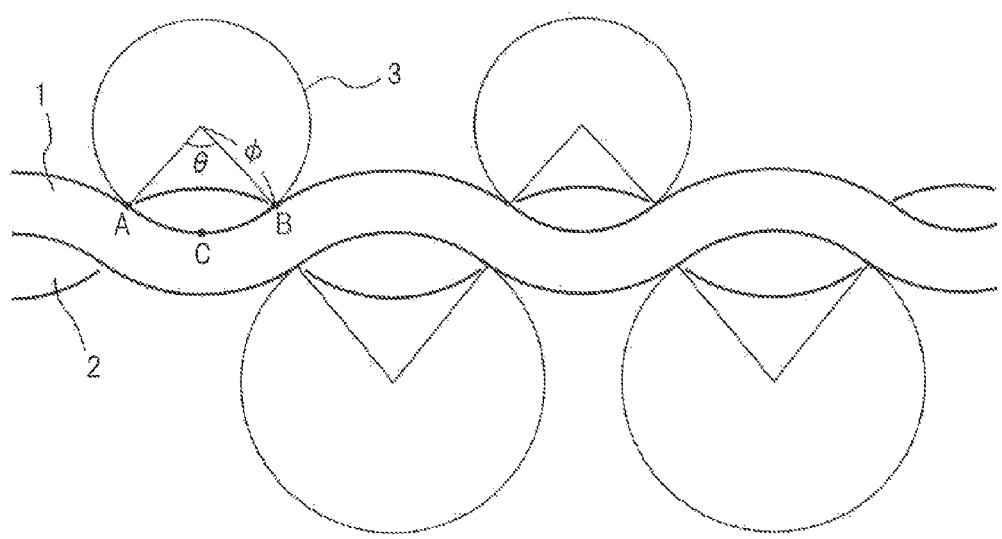
FIG. 1 is a drawing indicating the curved shape of threads in a cross-section of the woven fabric of the present invention for explaining the radius of curvature and contact angle of a circumscribed circle.

Although the warp threads and weft threads that compose the woven fabric are curved and come in mutual contact, when the woven fabric is cut along the center line of the threads, a cross-section in the lengthwise direction of the curved weft threads and a horizontal cross-section of the warp threads, or a cross-section in the lengthwise direction of the curved warn threads and a horizontal cross-section of the weft threads, come in contact, and cross-sections can be observed in which mutually intersecting sections of the warp threads and the weft threads in the form of contact line segments reach a maximum length. FIG. 1 is a drawing of a cross-sectional view taken along the center line of a warp thread, reference numeral 1 in the drawing indicates a cross-section of a curved warp thread in the lengthwise direction, and reference numeral 2 indicates a horizontal cross-section of a weft thread intersecting with the warp thread. The mutually intersecting section of the warp thread and weft thread in the form of a contact line segment is represented by arc ACB in the drawing, A and B represent both ends of the contact line segment, and C represents the central portion of the contact line segment. In the present invention, a circumscribed circle 3 was determined that is composed of these three points consisting of both ends and the central portion of the contact line segment, the intersecting section was taken to be a contact arc, and a central angle θ of the contact arc ACB in the circumscribed circle 3 was taken to be the contact angle of the intersecting section where the warp thread and weft thread come in contact. In addition, the radius φ of the circumscribed circle 3 was taken to be the radius of curvature of the intersecting section.

Asymmetry R, with respect to the front and back sides of the woven fabric and represented by the following equation, of the radius of curvature φ of the intersecting section where the warp thread and the weft thread come in contact in a cross-section of the woven fabric is within the range of 1.05 to 1.50:

$$R=\phi a/\phi b$$

provided that φa represents the larger radius of curvature among the radii of curvature φ on the front side and rear side of the woven fabric, and φb represents the smaller radius of curvature.

If the asymmetry R is 1.05 or more, permeability under high pressure is low and tear strength is high. If asymmetry is large at 1.05 or more, the radius of curvature on one side is small, the warp and weft threads firmly bite into each other, and air permeability under high pressure is suppressed. In the case of having the side having the smaller radius of curvature ϕ (ϕb side) on the inside and subjecting to a differential pressure load in particular, the ϕb side is the side in which engaging of the fibers becomes even tighter due to the deflection of the woven fabric, thereby contributing to reduction of dynamic air permeability. On the other hand, since engaging of warp and weft fibers is disrupted comparatively easily on the side having the larger curvature of radius on the opposite side (ϕa side), decreases in tear strength are suppressed. On the other hand, if the asymmetry R is 1.50 or less, decreases in tear strength attributable to excessive deformation of the weave and the like can be avoided. The asymmetry R is more preferably 1.10 to 1.40.

In the woven fabric of the present invention, asymmetry U, with respect to the front and back sides of the woven fabric and represented by the following equation, of the contact angle θ of an intersecting section where the warp thread and the weft thread come in contact in a cross-section of the woven fabric is preferably within the range of 1.05 to 1.40:

$$U=\theta b/\theta a$$

provided that θb represents the contact angle of the intersecting section on the ϕb side and θa represents the contact angle on the ϕa side, If the asymmetry U of the contact angle is 1.05 or more, the asymmetry R of the radius of curvature becomes large, while if the asymmetry U of the contact angle is 1.40 or less, the asymmetry R of the radius of curvature becomes small. The asymmetry U of the contact angle is more preferably 1.08 to 1.40.

Tear utilization factor E of tear strength (N) with respect to tensile strength (N/cm) is preferably greater than 0.20 but less than 0.50. Tear strength referred to here is in accordance with that obtained by a single tongue test. In a single tongue test, a weft tear test is an evaluation consisting of cutting the weft threads, and the weft tensile test is an evaluation consisting of stretching and breaking in the weft direction. Similarly, a warp tear test is an evaluation consisting of cutting the warp threads, and the warp tensile test is an evaluation consisting of stretching and breaking in the warp direction. The respective ratio thereof (tear strength/tensile strength) was taken to be the tear utilization factor E of tear strength with respect to tensile strength. If the tear utilization factor E exceeds 0.20, balance among mechanical properties is favorable and resistance of the air bag to bursting is also favorable. If the tear utilization factor E is less than 0.50, there is favorable balance with air permeability and high-pressure deployment of the air bag is also favorable. As a result of the magnitude of the tear utilization factor E differing between the front and back sides, relief of the threads at the tear point occurs easily, and since this causes the threads to converge resulting in resistance to cutting, tear strength is increased.

The rate of change in the tear utilization factor E before and after exposing for 100 hours in an environment at 120° C. (tear utilization factor E after exposure/tear utilization factor E before exposure) is preferably 90% or more. If the rate of change before and after exposure to heat is 90% or more, burst resistance when used as an air bag can be expected to be demonstrated after being exposed to environmental change. The rate of change before and after heat exposure is more preferably 95% or more. The rate of change in the tear utilization factor before and after heat exposure increases in combination with increased resistance to weave deformation at the tear point as a result of the warp threads and the weft threads of the woven fabric undergoing thermal embrittlement causing the form in which they bite into each other to become fixed, and resistance of the thread surfaces to thermal degradation. The rate of change in the tear utilization factor before and after heat exposure is preferably as high as possible. On the other hand, the rate of change in tear utilization factor before and after heat exposure is preferably 110% or less. If the tear utilization factor does not increase to larger than that before heat exposure, there is no change in the form in which the threads bite into each other in a direction that causes that form to be disrupted, and there is no lack of balance with other properties such as suppression of high-pressure permeability.

In the woven fabric for an air bag of the present invention, the synthetic fibers that compose the woven fabric are fibers composed of a thermoplastic resin, and can be selected from among polyamide fibers or polyester fibers and the like.

Examples of polyamide fibers that compose the woven fabric include polyamide 6, polyamide 6•6, polyamide 11, polyamide 12, polyamide 6•10, polyamide 6•12, polyamide 4•6, copolymers thereof and fibers composed of mixed resins thereof. In particular, polyamide 6•6 fibers are preferably fibers composed mainly of polyhexamethylene adipamide. Although polyhexamethylene adipamide refers to polyamide resin composed of 100% hexamethylenediamine and adipic acid that has a melting point of 250° C. or higher, fibers composed of polyamide 6•6 used in the present invention may also be fibers composed of resin obtained by copolymerizing or blending polyamide 6, polyamide 6•I, polyamide 6•10 or polyamide 6•T and the like with polyhexamethylene adipamide within a range over which the melting point of the resin does fall below 250° C.

Examples of polyester fibers include fibers composed of resin obtained by polycondensation of a carboxylic acid and/or a derivative thereof with a diol using a known method, resin composed of a hydroxycarboxylic acid and resin obtained by copolymerization or blending thereof. Examples of the carboxylic acid component that composes the polyester fibers include aromatic dicarboxylic acids such as terephthalic acid, isophthalic acid or 2,6-naphthalene dicarboxylic acid, aliphatic dicarboxylic acids such as oxalic acid, succinic acid, maleic acid or fumaric acid, and alicyclic dicarboxylic acids such as 1,4-cyclohexane dicarboxylic acid. Examples of diols include aliphatic diols such as ethylene glycol, 1,2-propylene glycol, 1,3-propylene glycol, 1,3-butanediol, trimethylene glycol or diethylene glycol, and diphenols such as hydroquinone, resorcinol or bisphenol A. Examples of hydroxycarboxylic acids include aromatic hydroxycarboxylic acids such as p-hydroxybenzoic acid. Specific examples of polyester fibers include polyethylene terephthalate fibers, polybutylene terephthalate fibers, polytrimethylene terephthalate fibers, polycyclohexylene dimethylene terephthalate fibers, polyethylene naphthalate fibers, polybutylene naphthalate fibers, polyethylene isophthalate-terephthalate copolymer fibers, polybutylene isophthalate-terephthalate copolymer fibers, and polycyclohexylene dimethylene isophthalate-terephthalate copolymer fibers. From the viewpoints of strength and heat resistance, polyethylene terephthalate fibers, polybutylene terephthalate fibers, polytrimethylene terephthalate fibers, polycyclohexylene dimethylene terephthalate fibers and polyethylene naphthalate fibers are preferable, and polyethylene terephthalate fibers, polybutylene terephthalate fibers, polytrimethylene terephthalate fibers and polyethylene naphthalate fibers are more preferable. Polyethylene terephthalate fibers are particularly preferable, and polyethylene terephthalate fibers containing 90 mol % or more, and preferably 95 mol % or more, of ethylene terephthalate repeating units in the molecular chain thereof are preferable from the viewpoints of strength and heat resistance. The polyethylene terephthalate fibers may contain other copolymer components at a ratio of less than 10 mol % and preferably less than 5 mol %. Examples of such copolymer components include isophthalic acid, 2,6-naphthalene dicarboxylic acid, 2,5-naphthalene dicarboxylic acid, 2,7-naphthalene dicarboxylic acid, 1,5-naphthalene dicarboxylic acid, adipic acid, p-oxybenzoic acid, diethylene glycol, propylene glycol, 1,4-butylene glycol, trimellitic acid and pentaerythritol.

Furthermore, the synthetic fibers may contain various types of additives routinely used to improve productivity or properties in the production and processing processes of bulk yarn. Examples of additives that can be contained include heat stabilizers, antioxidants, light stabilizers, lubricants, antistatic agents, plasticizers and flame retardants.

The amount of fluff attributable to filament breakage of the synthetic fibers used in the woven fabric of the present invention is preferably 100 or less per $10^8$ m so as to enable high-density weaving without sizing during warping.

The synthetic fibers used in the fabric of the present invention are preferably substantially not twisted. Substantially not twisted means that fibers are used in which twists have intentionally not been carried out, and that the number of twists is not observed to exceed unwinding twisting of less than 10/m, which occurs when removing the bulk yarn from the package. The use of untwisted, synthetic fibers makes it easy to control the morphology in which the warp threads and weft threads bite into each other during high-density weaving on a loom.

In addition, the synthetic fibers used in the woven fabric of the present invention preferably have a number of air entanglements of 5 counts/In to 30 counts/m in order to obtain convergence of filament assemblies. If the number of air entanglements is 5 counts/m or more, a high-density woven fabric can be woven and finished without sizing and without scouring or only after mild scouring. If the number of air entanglements is 30 counts/m or less, the form in which the warp threads and the weft threads bite into each otter during weaving can be easily realized asymmetrically on the front and back sides of the woven fabric. Moreover this asymmetry is maintained on the front and back sides of the woven fabric even after exposing to a high-temperature environment. If the number of air entanglements is 30 counts/m or less, the filament assemblies in the woven fabric are disrupted and a form in which the warp threads and weft threads bite into each other that is controlled by the curved shape of the fibers can be obtained. In addition, if filament assemblies in the woven fabric are adequately disrupted after weaving, it is difficult for the form in which the warp threads and weft threads bite into each other to be disrupted due to exposure to a nigh-temperature environment.

The fineness of the synthetic fibers that compose the woven fabric is preferably 300 dtex to 720 dtex and more preferably 380 dtex to 550 dtex. If the fineness is large at 300 dtex or more, mechanical properties increase, thereby contributing to pressure resistance of the air bag. If the fineness is small at 720 dtex or less, the fabric weight decreases. In addition, the synthetic fibers that compose the woven fabric are multifilament fibers composed of assemblies of filaments, and the fineness of the filaments is preferably greater than 2 dtex but less than 8 dtex. A filament fineness of less than 8 dtex results in a larger contact angle and makes it easier for the threads to adopt a engaged form. Filament, fineness in excess of 2 dtex eliminates susceptibility to filament damage during processing and does not impair the mechanical properties of the woven fabric. The cross-sectional shape of the filaments is preferably substantially round. Dynamic high-pressure air permeability of a fabric becomes difficult to suppresses cross-sectional shape becomes increasingly flat.

The cover factor of the woven fabric is preferably 2000 to 2600. Cover factor CF is determined by the calculation indicated below, $$CF=(\sqrt{\text{warp thread fineness (dtex)}} \times \text{warp thread density (count/2.54 cm)}) + (\sqrt{\text{weft thread fineness (dtex)}}) \times \text{weft thread density (count/2.54 cm)}$$

Here, the warp thread fineness and weft thread fineness respectively refer to the fineness of the synthetic fibers that compose the fabric.

Cover factor is the degree to which fibers fill a plane, and static air permeability is suppressed if that value is 2000 or more. There are no difficulties in the weaving process if the cover factor is 2600 or less.

The weave of the fabric is preferably a plain weave basically composed of same and single yarn for both the warp threads and the weft threads. A plain weave may be obtained by weaving with two mat weaves for both the warp and weft in order to obtain a high-density plain weave. The difference in weaving density between the warp and weft threads is about 10% or less and the weaving density is preferably substantially equal.

Dynamic high-pressure air permeability is determined by measuring air permeability by rapidly shifting the pressure applied to a sample by momentarily opening the valve of a high-pressure gas tank, and refers to air permeability at a pressure of 100 kPa as determined using the FX3350 manufactured by Textest Inc. in compliance with ASTM D6476. Dynamic high-pressure air permeability was evaluated on the front and back sides. Dynamic high-pressure air permeability is preferably 1200 mm/s or less, and preferably as little air as possible is detected. Dynamic high-pressure air permeability is more preferably 1000 mm/s or less. Air pressure permeability ratio P of pressure applied to the front and back sides of the woven fabric is preferably 0.90 to 0.20 and more preferably 0.80 to 0.30. As a result, of air permeability being asymmetrical, air permeability is favorably suppressed on the side having low air permeability.

In the woven fabric for an air bag of the present invention, the content of an oil component extracted with cyclohexane is preferably from 0.03% by weight to 0.3%, more preferably 0.03% by weight to 0.2% by weight, and even more preferably 0.05% by weight to 0.15% by weight based on the weight of the base cloth. If the content of the cyclohexane-extracted oil component is 0.03% by weight or more, the friction of the surface of the woven fibers decreases and decreases in tear strength of the woven fabric can be prevented. Thus, bursting resistance of the air bag can be enhanced. On the other hand, the loss of composite threads can be prevented by making the content of the cyclohexane-extracted oil to be 0.03% by weight or less, thereby making it possible to avoid escape of gas used to deploy the air bag and rupturing of the air bag caused by the concentrated passage of hot gas. In order to make the content of the extracted oil component to be 0.03% by weight to 0.3% by weight, an oil component can be imparted to the woven fabric by de-oiling spinning oil components originating in the thread production process or warping oil components in the thread warping process in a water jet loom process used to produce the fabric, or by suitably selecting conditions of the scouring process following weaving. Preferably, the spinning oil component and warping oil component are reduced to a suitable oil component content by running water in a water jet weaving process, and in such cases, a separate scouring process may be omitted.

The threads composed of synthetic fibers are sent to the warping process preferably without twisting or sizing, and after going through beam warping, are rewound onto the warping beam for use as warp thread. In addition, a portion is provided for use as weft thread followed by weaving.

It is firstly important that the threads asymmetrically form a curved engaged state on the loom to obtain the woven fabric of the present invention. When opening or shedding the warp threads on the loom, preferably a difference of 5% to 90%, and more preferably a difference of 10% to 50%, is provided between the tension of the upper thread and lower thread. A method for providing a difference between the tension of the upper thread and lower thread consists of changing the warp tension on the front and back sides of the woven fabric since the travel lengths of the upper thread and lower thread change prior to the intersecting sections of the warp thread and the weft thread in the form of the fabric fell when the position of the back roller (tensioning roller) is shifted up and down from the center of the opening by the heddle.

Moreover, low air permeability is ultimately achieved by creating effective beating conditions at a somewhat high warp tension by setting the warp tension to an average for the upper thread and lower thread of 0.20 cN/dtex to 0.65 cN/dtex. The asymmetric weave formed during weaving is to be maintained in subsequent steps and prevented from becoming symmetrical. A water jet loom, air jet loom or rapier loom can be used for the loom. Among these, the use of a water jet loom is preferable since the oil content can be controlled without using a subsequent scouring process.

In the scouring process, caution is required since the curved state of the engaged threads asymmetrically formed in the weaving process has a tendency to be disrupted due to the contractive action of the synthetic fibers in hot water. A scouring method is to be used in which scouring is carried out at a temperature of preferably at 80° C. or lower, and more preferably 60° C. or lower, while the fabric is spread out wide without causing rubbing or other stimulation. The scouring process is most preferably completely omitted.

Caution is also required in the drying process so that the curved form of the asymmetrically engaged fibers formed in the weaving process is not disrupted. Consequently, it is necessary to avoid excessive occurrence of contraction of the synthetic fibers used for the threads. Drying treatment is preferably carried out at 110° C. or lower and more preferably at 80° C. or lower.

The woven fabric is preferably finished in a clendering process. The curved form in which threads are asymmetrically engaged formed in the weaving process is fixed here with heat and pressure. This form is preferably maintained by single-sided calendering processing on the side having the smaller radius of curvature $\phi$ of the warp and weft threads. In comparison with a heat setting process using a so-called tenter and the like, disruption of the curved form in which the threads are adequately engaged due to the contractive action of the threads is avoided.

Although the heating temperature of the calender rollers can be determined by combining with applying pressure at a temperature equal to or higher than the vicinity of the softening temperature of the fiber material, a temperature of 40° C. to 250° C. can be suitably selected. Polymer structure is fixed in this not calendering process in the portion of the woven fabric in which hardly any hot water shrinkage is demonstrated in the scouring process and the like where strain remains in the fiber polymer structure. The heating temperature is preferably 120° C. or higher in order to fix the polymer structure of the fibers composing the woven fabric. On the other hand, the heating temperature is preferably 220° C. or lower so that there is no obvious deformation of filament cross-sections of the composite fibers resulting in a significant decrease in tear strength or other mechanical properties. More preferably, the heating temperature is 150° C. to 200° C. The processing pressure in terms of linear pressure is preferably 100 N/cm to 300 N/cm. A processing pressure of 100 N/cm or more contributes to a structure having a large contact angle of intersecting sections of the woven fabric threads, while a processing pressure of 3000 N/cm or less makes it possible to prevent filament cross-sections of the composite fibers from significantly deforming, thereby causing a significant decrease in tear strength and other mechanical properties. Although able to be suitably selected, processing speed is preferably 1 m/min to 30 m/min. If processing speed is 1 m/min or more, relaxation of the structure of woven fabric threads due to the effects of heat in the absence of compressive action before and after rolling resulting in the asymmetrical structure becoming symmetrical is easily prevented. On the other hand, if the processing speed is 30 m/min or less, adequate hot compression effects are easily obtained, and uniform processing, which makes it possible to avoid quality abnormalities such as bending, is realized easily. The surface of the calender rollers is preferably flat and the roughness thereof can be suitably selected. Roughness is suitably modified within a range such that the surface of the rollers does not become remarkably glossy in the manner of a mirrored surface. In addition, the material of the heating rollers can be suitably selected from among roller surface materials having high rigidity and favorable thermal conductivity such as metal, ceramics, paper, elastomer or plastic. In hot clendering processing, since effects thereof are influenced by the moisture content of the fabric, the fabric moisture content is to be suitably controlled.

The curved form in which threads are adequately engaged while the curvature of radius $\phi$ of the warp and weft threads remains small is maintained and asymmetry of the woven fabric is fixed on the side that contacts the heating rollers. Moreover, smoothness of the woven fabric is improved on the surface having a small radius of curvature $\phi$ of the warp and weft threads, thereby contributing to legibility of printing quality when inkjet printing the woven fabric for the purpose of product identification.

On the other hand, the curved form in which woven fibers are adequately engaged is somewhat disrupted and the radius of curvature $\phi$ of the warp and weft threads become somewhat large on the side that contacts the back roller. The resulting woven fabric has greater flexibility in the case of bending the woven fabric with this surface on the inside.

The woven fabric of the present invention is suitable for use in an air bag by being cut and sewn as is. On the other hand, the woven fabric of the present invention may also be used as a base fabric for an air bag by coating with a resin, or elastomer. If the side having a small radius of curvature $\phi$ of the warp and weft threads is coated, and air bag base cloth is obtained that has a uniformly coated surface at a low coated amount. On the other hand, if the side having a large radius of curvature $\phi$ of the warp and weft fibers is coated, an air bag base cloth is obtained that is resistant to separation and demonstrates superior adhesive stability at a low coated amount.

A sewn air bag composed of the woven fabric of the present invention can also be used as an air bag module or air bag unit by incorporating therein. A woven fabric on which information relating to the material or production has been printed by ink at printing for the purpose of identification can also be used and if inkjet printing is carried out on the side having a small radius of curvature ϕ of the warp and weft fibers, legible identifying information is obtained. Moreover, if inkjet printing is carried by reverse printing with the side having a small radius of curvature ϕ of the warp and weft threads on the inside of the air ban, identifying information can also be read by making the threads visible from outside the air bag.

EXAMPLES

Although the following provides an explanation of the present invention according to examples and reference examples thereof, the present invention is not limited to only these examples. First, an explanation is provided of measurement methods and evaluation, methods used in the present description.

Figure 2:
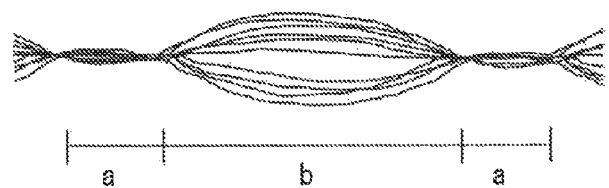
FIG. 2 is a drawing showing a state in which synthetic fibers have been floated in a water bath for measuring entanglement.

(1) Number of Synthetic Fiber Entanglements (count/m): The number of synthetic fiber entanglements was determined by floating the synthetic fibers on the surface of water and observing the status of the filament bundles using a water bath for measuring entanglement. The water bath was of a size measuring 1.0 m long, 20 cm wide and 15 cm high (water depth), and water supplied from a supply port was drained from the water bath by overflow. Namely, water inside the measurement bath was replenished by constantly supply fresh water at a flow rate of about 500 cc/min. The number of entangled portions a of the filament bundles that spread out on the water surface was counted by employing this water immersion method as shown in FIG. 2. This measurement was repeated ten times followed by determination of the average value thereof.

(2) Fabric Sample Preparation: The fabric was used in each measurement and evaluation after adjusting to the standard state of JIS L0105:2006.

(3) Weaving Density (ends/2.54 cm): Weaving density was measured according to Appendix FA of Method 8.6.1b) B of JIS L1096:2010.

(4) Synthetic Fiber Fineness (dtex): Fineness was measured according to Appendix H (Method B) of method 8.9.1.1a)2)B of JIS L1096:2010.

(5) Contact Angle (degrees) and Radius of Curvature (μm): A cross-section in the warp direction and a cross-section in the weft direction were cut out of the woven fabric along the center line of the threads followed by taking electron micrographs of the cross-sections at a magnification 35×. As shown in FIG. 1, the circumscribed circle 3 was drawn from three points consisting of points A and B at both ends of the section where the warp and weft threads intersect and the center point C thereof followed by determination of the central angle θ of arc ACB of the intersecting section along with the radius of curvature ϕ of the circumscribed circle. The circumscribed circle 3 was respectively drawn at 10 random points on the front and back sides of the woven fabric sample and the central angle θ and radius ϕ were determined for the front and back sides followed by determining the average values thereof. The larger radius of curvature ϕ among the radii of curvature on the front and back sides was designated as ϕa, while the smaller radius of curvature was designated as ϕb. The value of θ corresponding to ϕa was designated as θa, and the value of θ corresponding to ϕb was designated as θb.

(6) Tear strength (N) Tear strength was measured according to Method 8.17.1A-1 of JIS L1096:2010.

(7) Tensile strength (N/cm): Tensile strength was determined by measuring in accordance with Method 8.14.A1 (stripping method) of JIS L1096:2010 followed by dividing by the sample width of 3 cm.

(8) Tear Utilization Factor: Tear utilization factor was determined by dividing the aforementioned tear strength by tensile strength.

(9) Cyclohexane-Extracted Oil Component (OPU): A woven fabric sample was extracted with cyclohexane using a Soxhlet extractor. The amount of oily agent component (wt %) in the sample was determined from the weight of the cyclohexane-extracted fraction after drying up.

(10) High-Pressure Air Permeability (mm/s): Air permeability was determined when the rise in pressure reached 100 kPa by measuring dynamic air permeability with the FX3350 manufactured by Textest Inc. in compliance with ASTM D6476.

(11) Comparative Evaluation of Flexibility: Air bags not having a 60 L vent hole were respectively sewn in the case of having the side having the larger radius of curvature of thread contact intersecting sections on the inside, and the case of having the side having the smaller radius of contact intersecting sections on the inside, followed by injecting gas to a pressure of 30 kPa. The center surface of the inflated air bag was pressed with the back of the hand and that sensation during pressing was compared for each air bag. The case in which there was a clear difference between the sensations of pressing flexibility and cushioning was evaluated with A, the case in which there was a difference was evaluated with B, and the case in which a difference was not detected was evaluated with C.

(12) Inkjet Printing: A bar code having a width of 10 mm was printed on the woven fabric using ethanol-based black ink with an inkjet printer equipped with a 60 micron nozzle at a woven fabric feed rate of 20 m/min. The printed surface was observed with a 35× magnifying glass and the printed bars of the bar code were evaluated for bleeding, and printing in which the borders of the bars were well-defined and free of bleeding was evaluated with A, printing in which the borders of the bars were well-defined but bleeding was observed was evaluated with B, and printing in which the borders of the bars contained portions that were indistinct was evaluated with B'.

(13) Evaluation After Heat Exposure: The fabric was suspended in an air oven at 120° C., and after allowing to stand exposed for 100 hours, the fabric was returned to the standard state followed by determination of tear utilization factor in accordance with the aforementioned items (6) to (8). In addition, the rate of change before and after exposure (tear utilization factor E after exposure/tear utilization factor E before exposure) was determined from the tear utilization factors before and after exposure.

Example 1

Polyhexamethylene adipamide was melt and spun followed by hot drawing, and the resulting fibers having tenacity of 8 cN/dtex were used as weaving threads. The fibers contained 50 ppm of copper and 1500 ppm of iodine added during resin polymerization. These fibers demonstrated fineness of 470 dtex, filament count of 136 and boiling water shrinkage of 7.0%, and the number of air entanglements as determined according to the water immersion method was 10 counts/m. These fibers were used a weaving threads. The threads were uniformly arranged without twisting and without sizing to comprise a warping beam for use as warp threads. The threads were then used without twisting or sizing and supplied directly from the package for use as weft threads. When setting warp tension on the loom with a water jet loom, the lower thread tension was set 1.05 times higher than the upper thread tension during opening, and plain weaving was carried out at 400 picks per minute. The resulting woven fabric was dried at 60° C. without scouring to reduce the fabric moisture content to 3%. Next, the fabric was treated by of calender processing at a feed rate of 18 m/min, metal roller temperature of 160° C. and pressure of 490 N/cm. The calender rollers that sandwiched the woven fabric from above and below consisted of an upper metal roller for heating having a diameter of 12 cm and a lower roller having a paper surface and a diameter of 24 cm, and the surface speeds were the same for the upper and lower rollers. The paper roller surface had a Shore D hardness of 65. At this time, the side woven at a high warp tension was treated with the hot calender rollers. The weaving density of the finished fabric was 51.0 ends/2.54 cm for both the warp and weft. The production conditions and evaluation results of the woven fabric are shown in Table 1. The woven fabric demonstrated a difference in the curved structure of the woven threads between the front and back sides and had an asymmetrical structure. High-pressure air permeability differed depending on whether pressure was applied to the front side or rear side, with the woven fabric demonstrating low air permeability and favorable suppression of air permeability when the side having the smaller radius of curvature was used as the pressed side. Tear strength was high. Flexibility and cushioning of the surface when inflated with gas differed between the front and back sides of the woven fabric, and in the case the fabric was inflated with gas with the side having low air permeability on the inside, there was little leakage of can flow while maintaining a constant pressure, and a gentle as was imparted to the human-body when the inflated fabric was pushed in from the outside. Inkjet printability of the low air permeability side having a smaller radius of curvature was favorable, and problems with indicating identifying information did not occur.

Example 2

Example 2 was carried cut in the same manner as Example 1 with the exception of setting the lower thread tension 1.10 times higher than the upper thread tension during opening when setting the warp tension on the loom with a water let loom. The production conditions and woven fiber evaluation results are shown in Table 1. Suppression of air permeability under high pressure was more effective, tear strength was favorable and flexibility and cushioning when inflated were also superior. Inkjet printability was also favorable.

Example 3

Example 3 was carried out in the same manner as Example 1 with the exception of setting the lower thread tension 1.20 times higher than the upper thread tension during opening when setting the warp tension on the loom with a water jet loom. The production conditions and woven fiber evaluation results are shown in Table 1. Suppression of air permeability under high pressure was more effective, tear strength was favorable and flexibility and cushioning when inflated were also superior. Inkjet printability was also favorable.

Example 4

Example 4 was carried out in the same manner as Example 1 with the exception of setting the lower thread tension 1.30 times higher than the upper thread tension during opening when setting the warp tension on the loom with a water jet loom. The production conditions and woven fiber evaluation results are shown in Table 1. Suppression of air permeability under high pressure was more effective, tear strength was favorable and flexibility and cushioning when inflated were also superior. Inkjet printability was also favorable.

Example 5

Example 5 was carried out in the same manner as Example 1 with the exception of setting the lower thread tension 1.40 times higher than the upper thread tension during opening when setting the warp tension on the loom with a water jet loom. The production conditions and woven fiber evaluation results are shown in Table 1. Suppression of air permeability under high pressure was more effective, tear strength was favorable and flexibility and cushioning when inflated were also superior. Inkjet printability was also favorable.

Example 6

Polyethylene terephthalate fibers having a fineness of 550 dtex, a filament count of 144, tenacity of 7 cN/dtex, boiling water shrinkage of 2.2% and 10 entanglements/m were used for the weaving thread. When setting warp tension on the loom with a water jet loom, the lower thread tension was set 1.10 times higher than the upper thread tension during opening, and plain weaving was carried out at 400 picks per minute. The resulting woven fabric was then dried at 60° C. without scouring to reduce the fabric moisture content to 0.8%. Next, the woven fabric was subjected to hot calender processing at a feed rate of 18 m/min, metal roller temperature of 180° C. and pressure of 490 N/cm. The calender rollers that sandwiched the woven fabric from above and below consisted of an upper metal roller for heating having a diameter of 12 cm and a lower roller having a paper surface and a diameter of 24 cm, and the surface speeds were the same for the upper and lower rollers. The paper roller surface had a Shore D hardness of 65. At this time, the side woven at a high warp tension was treated with the calender rollers. The weaving density of the finished fabric was 51.0 ends/2.54 cm for both the warp and weft. The production conditions and woven fabric evaluation results are shown in Table 1.

Suppression of air permeability under high pressure was more effective, tear strength was favorable and flexibility and cushioning when inflated were also superior. Inkjet printability was also favorable.

Example 7

Example 7 was carried out in the same manner as Example 1 with the exception of making the number of air entanglements as determined according to the water immersion method to be 25 counts/m. Properties equal to those of Example 1 were demonstrated.

Comparative Example 1

Comparative Example 1 was carried out in the same manner as Example 1 with the exception of setting the lower thread tension and upper thread tension to the same values when setting warp tension on the loom with a water jet loom. The production conditions and woven fabric evaluation results are shown in Table 1. Inkjet printability on the hot calendered side was favorable as a result of single-sided calendering. However, since asymmetry was not obtained for the thread curved structure in the weaving stage, the curved structure lacked asymmetry even after finishing. Accordingly, suppression of air permeability under high pressure was limited and tear strength was also poor.

Comparative Example 2

Comparative Example 2 was carried out in the same manner as Example 1 with the exception of setting the lower thread tension only 1.02 times higher than the upper thread tension when setting warp tension on the loom with a water jet loom. The production conditions and woven fabric evaluation results are shown in Table 1. Inkjet printability on the hot calendered side was favorable as a result of single-sided calendaring. However, since there was only slight asymmetry of the thread curved structure in the weaving stage, the curved structure had little asymmetry even after finishing. Accordingly, suppression of air permeability under high pressure was limited and tear strength was also poor.

Comparative Example 3

Following the weaving of Example 2, the woven fabric was scoured for 3 hours in hot water at 90° C. followed by drying at 60° C. to reduce the moisture content to 0.8%. Next, the woven fabric was finished by heat setting for 1 minute at 180° C. with a pin tenter while driving the reed carriage of the cloth at an overfeed rate of 2% and at a cloth widening rate of 1%. The production conditions and woven fabric evaluation results are shown in Table 1. Asymmetry of the thread curved structure formed in the weaving stage ended up being alleviated in the scouring process and since it was further alleviated in the tenter setting process, there was little asymmetry of the curved structure after finishing. Accordingly, suppression of air permeability under high pressure was limited and tear strength was also poor.

Comparative Example 4

Following the weaving of Example 2, the woven fabric was dried at 60° C. without scouring to reduce the moisture content to 0.8%. Next, the woven fabric was finished by heat setting for 1 minute at 180° C. with a pin tenter while driving the reed carriage of the cloth at an overfeed rate of 3% and at a cloth widening rate of 2%. The production conditions and woven fabric evaluation results are shown in Table 1. Although asymmetry of the thread curved structure formed in the weaving process was maintained in the absence of scouring, since it ended up being alleviated in the tenter setting process, there was little asymmetry of the curved structure after finishing. Accordingly, suppression, of air permeability under high pressure was limited and tear strength was also poor.

Comparative Example 5

Following the weaving of Example 2, the woven fabric was scoured for 3 hours in hot water at 90° C. followed by drying at 60° C. to reduce the moisture content to 0.8%. Next, hot calendering processing was carried out at a feed rate of 18 m/min, metal roller temperature of 180° C. and pressure of 490 N/cm. The calender rollers that sandwiched the woven fabric from above and below consisted of an upper metal roller for heating having a diameter of 12 cm and slower roller having a paper surface and a diameter of 24 cm, and the surface speeds were the same for the upper and lower rollers. The paper roller surface had a Shore D hardness of 65. At this time, the side woven at a high warp tension was treated with the calender rollers. The production conditions and woven fabric evaluation results are shown in Table 1. Asymmetry of the thread curved structure formed in the weaving stage ended up being alleviated in the scouring process. In the case of single-sided calendering, there was little formation of asymmetry of the thread curved structure, suppression of air permeability under high pressure was limited and tear strength was also poor.

Comparative Example 6

A fabric was woven by setting the lower thread tension and upper thread tension during opening to the same values when the warp tension on the loom was set with a water jet loom in Example 6. Next, the woven fabric was scoured for 3 hours in hot water at 90° C. followed by drying at 60° C. to reduce the moisture content to 0.8%. Next, hot calendering processing was carried out at a feed rate of 18 m/min, metal roller temperature of 180° C. and pressure of 490 N/cm. The calender rollers that sandwiched the woven fabric from above and below consisted of an upper metal roller for heating having a diameter of 12 cm and a lower roller having a paper surface and a diameter of 24 cm, and the surface speeds were the same for the upper and lower rollers. The paper roller surface had a Shore D hardness of 65. At this time, the side woven at a high warp tension was treated with the calender rollers. The production conditions and woven fabric evaluation results are shown in Table 1. Inkjet printability on the hot calendered side was favorable as a result of single-sided calendering. However, asymmetry was not obtained for the thread curved structure in the weaving stage, asymmetry ended up being diminished by scouring processing, and although there was slight formation of asymmetry of the thread curved structure due to single-sided calendering processing since single-sided calendaring processing was the only asymmetrical processing, there was little asymmetry of the curved structure even after finishing. Accordingly, suppression of air permeability under high pressure was limited and tear strength was also poor.

Comparative Example 7

Comparative Example 7 was carried out in the same manner as Example 1 with the exception of making the number of entanglements of the polyhexamethylene adipamide fibers to be 34 counts/m. The production conditions and woven fabric evaluation results are shown in Table 1. It was difficult to obtain asymmetry between the front and back sides of the woven fabric, and asymmetry R was small. Tear utilization factor after exposing to heat decreased. The surface of the woven fabric was somewhat rough and inkjet printing lacked legibility. High-pressure air permeability was also not suppressed to a low level.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Bulk yarn entanglements |  | 10 | 10 | 10 | 10 | 10 | 10 | 25 |
| Radius of curvature asymmetry R ($\phi b/\phi a$) |  |  |  |  |  |  |  |  |
| Warp |  | 1.05 | 1.10 | 1.10 | 1.15 | 1.20 | 1.10 | 1.05 |
| Weft |  | 1.05 | 1.10 | 1.20 | 1.30 | 1.40 | 1.10 | 1.05 |
| Contact angle asymmetry $\theta$ ($\theta b/\theta a$) |  |  |  |  |  |  |  |  |
| Warp |  | 1.08 | 1.11 | 1.11 | 1.16 | 1.20 | 1.11 | 1.08 |
| Weft |  | 1.03 | 1.05 | 1.15 | 1.25 | 1.37 | 1.05 | 1.03 |
| Cyclohexane-extracted oil component (OPU) | (%) | 0.15 | 0.15 | 0.15 | 0.15 | 0.15 | 0.15 | 0.15 |
| Warp tension ratio (bobbin thread/needle thread) |  | 1.05 | 1.10 | 1.20 | 1.30 | 1.40 | 1.10 | 1.05 |
| Warp tear strength | N | 160 | 170 | 180 | 185 | 190 | 140 | 160 |
| Warp tensile strength | N/cm | 720 | 720 | 720 | 720 | 720 | 630 | 720 |
| Tear utilization factor E |  | 0.22 | 0.24 | 0.25 | 0.26 | 0.26 | 0.22 | 0.22 |
| Tear utilization factor change rate | % | 94 | 96 | 97 | 99 | 99 | 96 | 94 |
| Weaving density | (ends/2.54 cm) |  |  |  |  |  |  |  |
| Warp |  | 51.0 | 51.0 | 51.0 | 51.0 | 51.0 | 51.0 | 51.0 |
| Weft |  | 51.0 | 51.0 | 51.0 | 51.0 | 51.0 | 51.0 | 51.0 |
| Avg. |  | 51.0 | 51.0 | 51.0 | 51.0 | 51.0 | 51.0 | 51.0 |
| Cover factor |  | 2211 | 2211 | 2211 | 2211 | 2211 | 2392 | 2211 |
| High-pressure permeability | mm/s |  |  |  |  |  |  |  |
| a |  | 760 | 590 | 510 | 400 | 305 | 750 | 780 |
| b |  | 460 | 330 | 250 | 150 | 115 | 450 | 470 |
| Avg. |  | 610 | 360 | 380 | 275 | 210 | 600 | 625 |
| b/a |  | 0.61 | 0.56 | 0.49 | 0.38 | 0.38 | 0.60 | 0.60 |
| Comparative flexibility evaluation |  | B | A | A | A | A | B | B |
| Inkjet printability |  | A/B' | A/B' | A/B' | A/B' | A/B' | A/B' | A/B' |

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Bulk yarn entanglements |  | 10 | 10 | 10 | 10 | 10 | 10 | 34 |
| Radius of curvature asymmetry R ($\phi b/\phi a$) |  |  |  |  |  |  |  |  |
| Warp |  | 1.00 | 1.02 | 1.01 | 1.02 | 1.03 | 1.02 | 1.03 |
| Weft |  | 1.00 | 1.02 | 1.01 | 1.02 | 1.03 | 1.02 | 1.03 |
| Contact angle asymmetry $\theta$ ($\theta b/\theta a$) |  |  |  |  |  |  |  |  |
| Warp |  | 0.98 | 0.99 | 0.98 | 0.99 | 0.99 | 0.99 | 0.99 |
| Weft |  | 1.03 | 1.04 | 1.04 | 1.04 | 1.04 | 1.04 | 1.04 |
| Cyclohexane-extracted oil component (OPU) | (%) | 0.15 | 0.15 | 0.02 | 0.15 | 0.02 | 0.02 | 0.15 |
| Warp tension ratio (bobbin thread/needle thread) |  | 1.00 | 1.02 | 1.05 | 1.05 | 1.05 | 1.00 | 1.05 |
| Warp tear strength | N | 125 | 145 | 150 | 160 | 130 | 145 | 135 |
| Warp tensile strength | N/cm | 720 | 720 | 720 | 720 | 720 | 720 | 720 |
| Tear utilization factor E |  | 0.17 | 0.20 | 0.21 | 0.22 | 0.18 | 0.20 | 0.19 |
| Tear utilization factor change rate | % | 86 | 89 | 84 | 89 | 81 | 79 | 88 |
| Weaving density | (ends/2.54 cm) |  |  |  |  |  |  |  |
| Warp |  | 51.0 | 51.0 | 51.0 | 51.0 | 51.0 | 51.0 | 51.0 |
| Weft |  | 51.0 | 51.0 | 51.0 | 51.0 | 51.0 | 51.0 | 51.0 |
| Avg. |  | 51.0 | 51.0 | 51.0 | 51.0 | 51.0 | 51.0 | 51.0 |
| Cover factor |  | 2211 | 2211 | 2211 | 2211 | 2211 | 2392 | 2211 |
| High-pressure permeability | mm/s |  |  |  |  |  |  |  |
| a |  | 1300 | 1000 | 3300 | 2550 | 1660 | 1500 | 1200 |
| b |  | 1300 | 640 | 2300 | 2300 | 1400 | 1500 | 750 |

TABLE 1-continued

| Avg. | 1300 | 820 | 2800 | 2425 | 1530 | 1500 | 975 |
|---|---|---|---|---|---|---|---|
| b/a | 1.00 | 0.64 | 0.70 | 0.90 | 0.84 | 1.00 | 0.63 |
| Comparative flexibility evaluation | C | C | C | C | C | C | C |
| Inkjet printability | B/B' | B/B' | B'/B' | B'/B' | B'/B' | B'/B' | B'/C |

As is clear from Table 1, the woven fabric of the present invention demonstrates extremely low air permeability at high pressure and further demonstrates stability following exposure to heat.

INDUSTRIAL APPLICABILITY

The woven fabric of the present invention is preferable for an air bag that demonstrates low permeability under high pressure in the absence of resin coating, high tear strength and favorable reliability of resistance to high pressure. Moreover, in the case of using in an air bag, the surface that contacts the body is flexible and exhibits favorable cushioning, thereby making the woven fabric preferable for an air bag that realizes high-pressure deployment as well as reduction of the potential for injury when contacting the human-body.

BRIEF DESCRIPTION OF THE REFERENCE SYMBOLS 1 cross-section along warp fiber direction
2 cross-section of weft fiber
3 Circumscribed circle
A One end of contact line segment
B One end of contact line segment
C Central portion of contact line segment
θ Contact angle of intersecting section
φ Radium of curvature of intersecting section

The invention claimed is:

1. A woven fabric for an air bag composed of synthetic fibers, wherein asymmetry R, with respect to the front and back sides of the woven fabric and represented by the following equation, of the radius of curvature φ of an intersecting section where the warp thread and the weft thread come in contact in a cross-section of the woven fabric is within the range of 1.05 to 1.50:

$$R = \phi a / \phi b$$

wherein φa represents the larger radius of curvature among the radii of curvature φ on the front side and rear side of the woven fabric, and φb represents the smaller radius of curvature.

2. The woven fabric for an air bag according to claim 1, wherein a tear utilization factor E of tear strength (N) with respect to tensile strength (N/cm) is 0.20 to 0.50.

3. The woven fabric for an air bag according to claim 2, wherein the tear utilization factor E after exposing to an environment at 120° C. for 100 hours is 90% or more in comparison with that prior to exposure.

4. The woven fabric for an air bag according to any one of claims 1 to 3, wherein asymmetry U, with respect to the front and back sides of the woven fabric and represented by the following equation, of the contact angle θ of the intersecting section is within the range of 1.05 to 1.40:

$$U = \theta b / \theta a$$

wherein θb represents the contact angle on the φb side and θa represents the contact angle on the φa side.

5. The woven fabric for an aft bag according to any one of claims 1 to 3, further comprising a cyclohexane-extracted oil component at 0.03% by weight to 0.3% by weight based on the weight of the woven fabric.

6. The woven fabric for an air bag according to claim 1, wherein the synthetic fibers are composed of synthetic fibers having a substantially round cross-section filaments.

7. The woven fabric for an air bag according to claim 1, wherein the woven fabric is a plain weave fabric.

8. The woven fabric for an air bag according to claim 1, wherein the fineness of the synthetic fibers that compose the woven fabric is 300 dtex to 720 dtex.

9. The woven fabric for an aft bag according to claim 8, wherein the fineness of the synthetic fibers that compose the woven fabric is 380 dtex to 550 dtex, and the filament fineness thereof is greater than 2 dtex but less than 8 dtex.

10. The woven fabric for an aft bag according to claim 1, wherein the ratio of air permeability at a pressure difference of 100 kPa between the front and back sides of the woven fabric is 0.90 to 0.20.

11. The woven fabric for an air bag according to claim 1, wherein a bar code is imprinted thereon.

12. The woven fabric for an air bag according to claim 1, wherein synthetic fiber substantially free of twisting and having 5 to 30 entanglements/m is used for the weaving thread bulk yarn used to weave the woven fabric.

13. An air bag wherein the woven fabric for an air bag according to claim 1 is used.

14. The air bag according to claim 13, which does not have a resin coating.

* * * * *

UNITED STATES PATENT AND TRADEMARK OFFICE
CERTIFICATE OF CORRECTION

PATENT NO. : 9,822,471 B2
APPLICATION NO. : 14/652609
DATED : November 21, 2017
INVENTOR(S) : Ise It is certified that error appears in the above-identified patent and that said Letters Patent is hereby corrected as shown below:

On the Title Page

Item (57), Line 4, insert a space between "ϕ" and -- of --.

Item (57), Line 6, "range of 1.05-1,50" should read -- 1.05-1.50 --.

In the Claims

Claim 9, Column 20, Line 35, "an aft bag" should read -- an air bag --.

Claim 10, Column 20, Line 39, "an aft bag" should read -- an air bag --.

Signed and Sealed this
Third Day of July, 2018

Andrei Iancu
*Director of the United States Patent and Trademark Office*